United States Patent
Beaudoin et al.

(10) Patent No.: US 6,233,285 B1
(45) Date of Patent: May 15, 2001

(54) INTRINSICALLY SAFE CABLE DRIVE CIRCUIT

(75) Inventors: Kevin P. Beaudoin, Maple Grove; Kevin D. Voegele, Shakopee, both of MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 08/996,978

(22) Filed: Dec. 23, 1997

(51) Int. Cl.[7] ............................. H04B 3/50; H04L 25/02
(52) U.S. Cl. ............................ 375/257; 340/870.21
(58) Field of Search ........................ 375/257; 340/870.21

(56) References Cited

U.S. PATENT DOCUMENTS

| | | | |
|---|---|---|---|
| 3,657,478 | * 4/1972 | Andrews, Jr. | 178/63 E |
| 4,627,076 | * 12/1986 | Staal et al. | 375/257 |
| 4,665,938 | 5/1987 | Brown et al. . | |
| 4,794,372 | 12/1988 | Kazahaya . | |
| 4,847,867 | * 7/1989 | Nasu et al. | 375/257 |
| 4,947,406 | * 8/1990 | Yokoyama | 375/220 |
| 4,964,140 | * 10/1990 | Yonekura | 375/257 |
| 5,187,474 | * 2/1993 | Kielb et al. | 340/870.18 |
| 5,258,868 | 11/1993 | Jensen et al. . | |
| 5,333,114 | 7/1994 | Warrior et al. . | |
| 5,434,774 | 7/1995 | Seberger . | |
| 5,437,178 | 8/1995 | Esin et al. . | |
| 5,481,200 | 1/1996 | Voegele et al. . | |
| 5,485,400 | 1/1996 | Warrior et al. . | |
| 5,495,769 | 3/1996 | Broden et al. . | |
| 5,528,409 | 6/1996 | Cucci et al. . | |
| 5,535,243 | 7/1996 | Voegele et al. . | |
| 5,563,587 | 10/1996 | Harjani . | |
| 5,585,777 | 12/1996 | Johnson et al. . | |
| 5,587,824 | * 12/1996 | Asprey | 359/154 |
| 5,606,513 | * 2/1997 | Louwagie et al. | 702/138 |
| 5,610,552 | 3/1997 | Schlesinger . | |
| 5,684,831 | * 11/1997 | Moller | 375/257 |
| 5,818,884 | * 10/1998 | Reymond | 375/354 |
| 5,835,534 | * 11/1998 | Kogure | 375/257 |
| 5,841,648 | * 11/1998 | Mansfield | 363/59 |
| 5,887,032 | * 3/1999 | Cioffi | 375/257 |

OTHER PUBLICATIONS

Electronics Engineer's Handbook 3rd Edition, edited by Fink and Christiansen, 1989 McGraw Hill Book Company, chapter 16 pp. 7 and 12–15.*

* cited by examiner

Primary Examiner—Stephen Chin
Assistant Examiner—Paul N Rupert
(74) Attorney, Agent, or Firm—Kris T. Fredrick (57) ABSTRACT

A cable drive circuit allows a transmitter in a process control system to drive signals across a capacitive length of cable. The cable drive circuit uses a charge pump to store charge, which is then used in conjunction with open drain outputs to transmit logic signals across a cable to a peripheral at the other end of the cable. A microcontroller or other device specifies the number of communication pulses to send across the cable before allowing the charge pump to recharge. By transmitting communication pulses for a small percentage of the time the average current is minimized, making the circuit suitable for operation under the 4–20mA standard for two-wire devices.

23 Claims, 5 Drawing Sheets

INTRINSICALLY SAFE CABLE DRIVE CIRCUIT

BACKGROUND OF THE INVENTION

I. Field of the Invention

This invention relates to a drive circuit for a remote transmitter in a process control loop. More specifically, the invention relates to a drive circuit for driving signals across a cable from a microcontroller to a sensing apparatus located at a remote site.

II. Discussion of the Prior Art

Measurement transmitters sensing process variable information, such as differential pressure, line pressure, and temperature, are known. The transmitters are typically used in a process control industry installation where the transmitter power requirement is a concern. Measurement transmitters provide a current output representative of the variable they are sensing, where the magnitude of the current varies between 4–20 mA as a function of the sensed process variable. The current needed to operate a measurement transmitter must be less than 4 mA in order for the transmitter to adhere to this process control industry communications standard.

Most prior art transmitters are required to be located in the immediate vicinity of the location where the process variable information is being sensed. This is due primarily to the low power constraints imposed on the transmitter by the 4–20mA standard, in which the operating current of the measurement transmitter must be less than 4 mA. One way to place the sensing electronics at a longer distance from the measurement transmitter is to use a transmission cable between the sensing electronics and the measurement transmitter. The transmission cable acts as a capacitive load, requiring substantially more current to drive signals between the measurement transmitter and sensing electronics, while maintaining adequate rise and fall times. The longer the transmission cable is, the greater the capacitive load becomes. As a result, prior art transmitters have been required to be placed very close to the process variable being sensed. Often, the sensor electronics are, at most, a few inches from the transmitter components.

To meet certain Intrinsic Safety standards, the sensing electronics must be "infallibly" electrically isolated from the rest of the transmitter. Such standards are set forth by, for example, European CENELEC standards EN50014 and 50020, Factory Mutual Standard FM3610, the Canadian Standard Association, the British Approval Service for Electrical Equipment in Flammable Atmospheres, the Japanese Industrial Standard, and the Standards Association of Australia. The Intrinsic Safety requirements are intended to guarantee that instrument operation or failure cannot cause ignition if the instrument is properly in an environment that contains explosive gases. This is accomplished by limiting the maximum energy stored in the transmitter in a worst case failure situation. Excessive energy discharge may lead to sparking or excessive heat which could ignite an explosive environment in which the transmitter may be operating.

The prior art has primarily used two techniques to achieve infallible isolation between the sensor circuitry and the transmitter circuitry. The first technique is to provide sufficient mechanical segregation or spacing in the sensor such that it is impossible for a component failure to cause electrical shorting to another component or ground. the second technique is to design the entire system such that isolation is not required by using components which are rated for large power dissipation such that they themselves are considered infallible.

One problem with both of these techniques is that they require a sufficiently large transmitter housing to provide the required spacing between components or the relatively large size of the high power components. Thus, reduction in transmitter size has been limited when complying with Intrinsic Safety requirements using the above two techniques.

III. Objects and Advantages

Accordingly, it is a principal object of the present invention to provide an improved system for interfacing a measurement transmitter or microcontroller with a peripheral, such as a sensing electronics capsule, at a remote sensing site or location while still adhering to the 4–20 mA industry standard.

A further object of the invention is to provide an intrinsically safe cable drive circuit so that operation can be maintained even in hazardous gas environments.

SUMMARY OF THE INVENTION

The present invention provides a low power drive circuit for driving serial digital bits along a cable. The circuit uses a charge pump to store charge, which is then incrementally discharged (pulsed) to drive signals along the cable. After the capacitor has discharged to a certain level, the signal transmission is stopped and the capacitor is allowed to recharge. A microcontroller can be used to send or receive signal pulses and to control the time the circuit is driving signals along the cable. Directional control is provided so that signals can be transmitted or received along the cable. Voltage and current in the circuit are limited, so the circuit is intrinsically safe and can be used in a hazardous environment.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which.

DESCRIPTION OF THE PREFERRED EMBODIMENT

Figure 1:
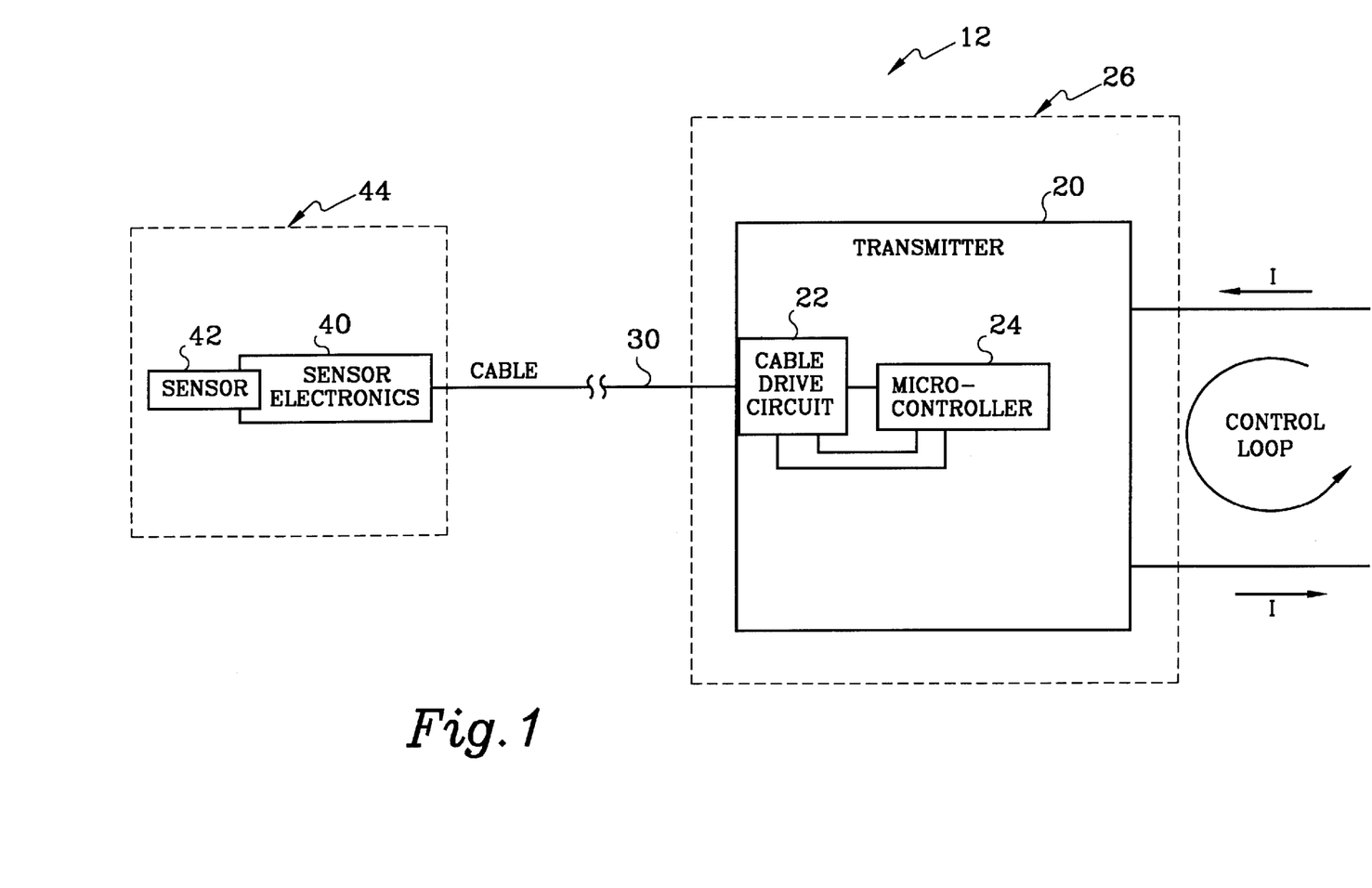
FIG. 1 is a simplified block diagram of a transmitter including the present invention.

FIG. 1 is a simplified block diagram of part of a process control system 12 incorporating the drive circuit 22 of the present invention. Transmitter 20 is coupled to control loop 10 and to a cable 30 connecting the transmitter 20, at a first location 26, to sensor electronics 40, at a second location 44. The transmitter 20 includes, for example, microcontroller 24 and drive circuit 22. Transmitter 20 may include other devices as well.

Transmitter 20 is powered through electric current I which is received from control loop 10. In one embodiment, control loop 10 operates under the fieldbus protocol, described in ISA 50.02-1992 Section 11, and carries digital information. Sensor 42 senses a process variable which is related to a parameter of the process, such as temperature, pressure, or flow. The sensor electronics 40 conditions the sensed process variable information. When a transmit data request is received from the control loop 10 by the transmitter 20, the microcontroller 24, at a first location 26, sends an instruction through the drive circuit 22, across the cable 30, and to the sensor electronics 40, at a second location 44. Upon receiving an instruction from the microcontroller 24, the sensor electronics 40 performs the desired operation. If a retrieval of process variable information is called for, then the sensor electronics 40, at a second location 44, sends the requested information back across cable 30, through drive circuit 22, and to the microcontroller 24, at a first location 26, for further processing.

Figure 2:
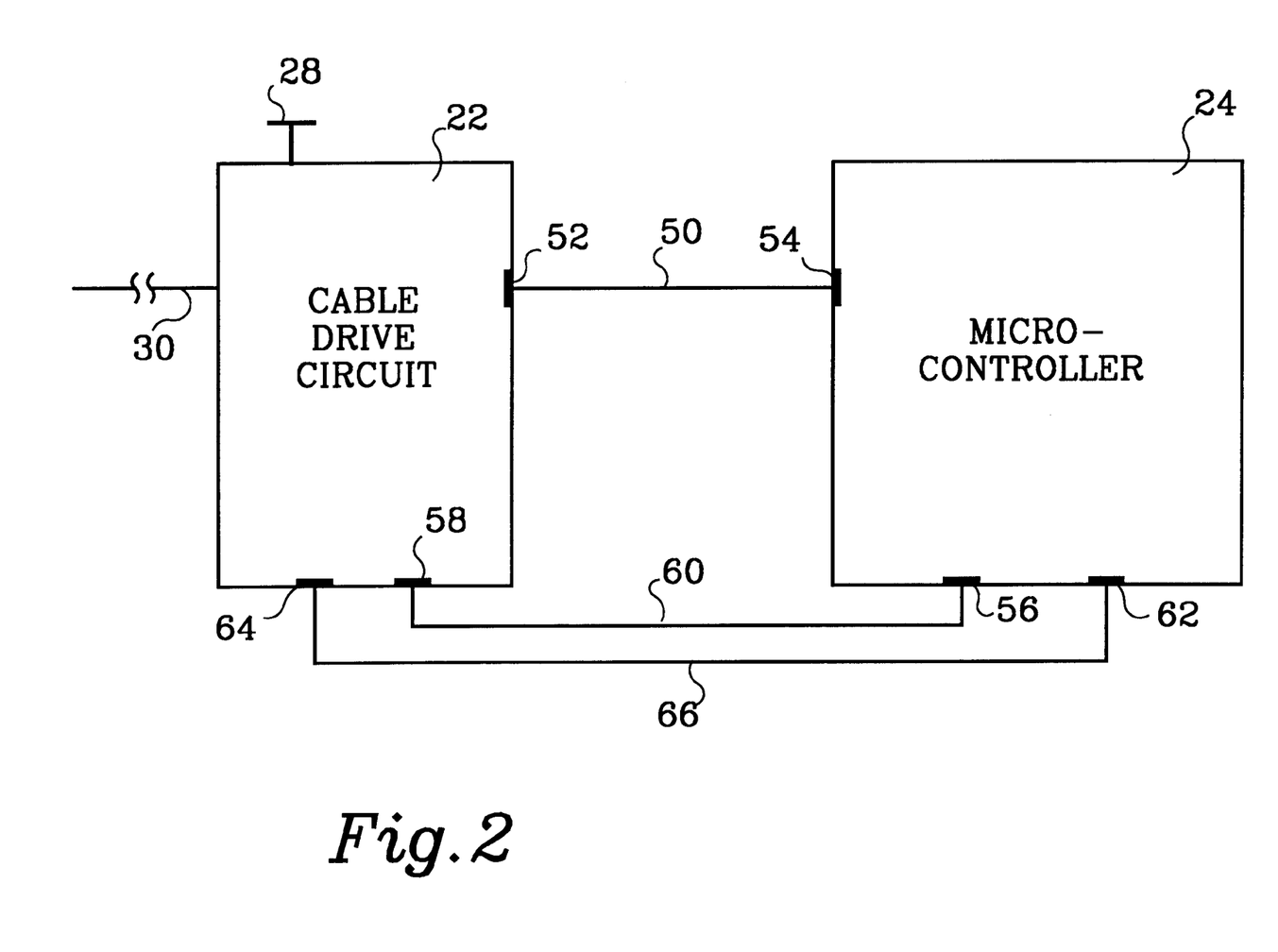
FIG. 2. is a simplified block diagram showing the connections between the microcontroller and the present invention.

FIG. 2 shows microcontroller 24 and drive circuit 22, along with electrical connections associated with the preferred embodiment. Supply node 28 of drive circuit 22 is connected to a DC supply of an appropriate voltage. In the preferred embodiment shown, node 28 is connected to an externally supplied 3.15+/−0.15 Vdc supply line. Cable 30 is shown connected to drive circuit 22. Microcontroller node 56 is connected to drive circuit node 58 by connection 60. Microcontroller node 62 is connected to drive circuit node 64 by connection 66. Node 54 of microcontroller 24 is connected to terminal 52 of drive circuit 22 by data line 50. Data line 50 serves as the information path between the microcontroller 24 and the drive circuit 22. Digital signals can be transmitted along data line 50. The connections between the microcontroller 24 and the drive circuit 22 are preferably very short, and may be traces on a Printed Wiring Board (PWB). Connections 60 and 66 are used to control the direction of data transmission along data line 50 between the microcontroller 24 and the drive circuit 22. In the preferred embodiment, when node 56 of the microcontroller is at logic 0 and node 62 of the microcontroller is at logic 1, data line 50 is used to receive information through drive circuit 22 from the sensor electronics (not shown). When node 60 of microcontroller 24 is at logic 1 and node 66 of microcontroller 24 is at logic 0, data line 50 acts as a data line transmitting information from the microcontroller 24, at a first location, to the drive circuit 22 and sensor electronics (not shown), at a second location.

Figure 3:
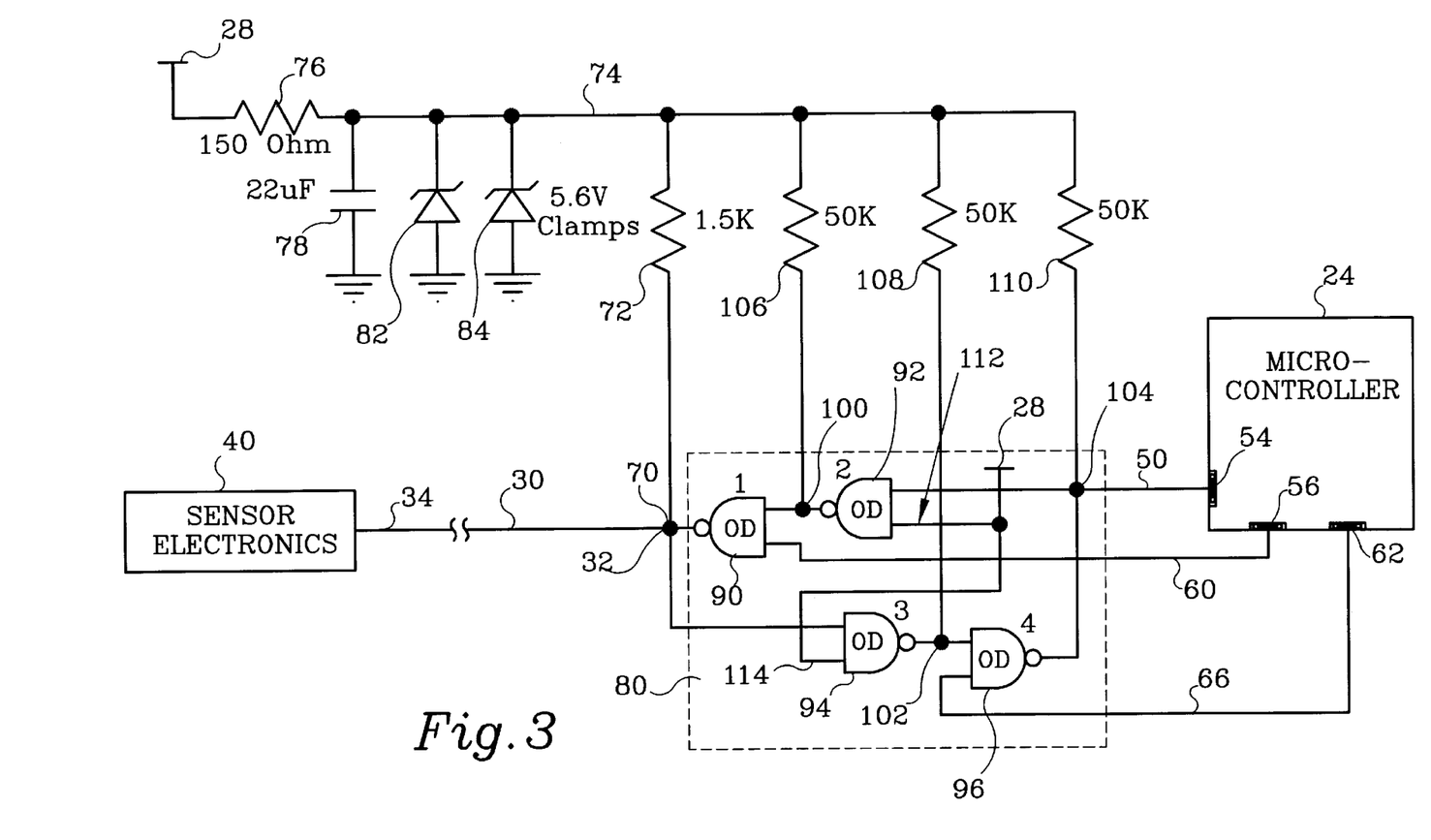
FIG. 3 is a schematic diagram showing the preferred embodiment of the invention at a gate level.

FIG. 3 shows a preferred embodiment of the present invention. Cable 30 is connected at one of its ends 32 to terminal 70 of drive circuit 22. Another end 34 of cable 30 is connected to sensor electronics 40. As an example, sensor electronics 40 could be a peripheral, consisting of a remote microcontroller, an A/D converter, sensors, or other devices. The length of cable that can be driven with the drive circuit of the present invention will depend on the cable characteristics.

Terminal 70 of drive circuit 22 is connected to end 32 of cable 30 and serves as the open drain signal line. Terminal 70 is also connected to switching circuitry, shown generally at 80. Terminal 70 is also connected to a pull-up supply line 74 through pull-up resistor 72, which preferably has a value of 1.5 kΩ.

A 3.15+/−0.15 Vdc supply line 28 is shown connected through resistor 76 to capacitor 78. A different supply voltage could be used, which would change the cable drive capabilities. The preferred values for resistor 76 and capacitor 78 are 150Ω and 22 μF, respectively. Resistor 76 governs the time to charge capacitor 78, which serves as the charge pump or storage device. Zener diodes 82 and 84 limit the voltage on capacitor 78. As a result, energy stored in capacitor 78 is limited, as is shown by the equation $E=\frac{1}{2}CV^2$, where E is energy, C is capacitance, and V is the voltage across the capacitor. Zener diodes 82 and 84 preferably are 5.6 V clamps. Two or more zener diodes are used to provide redundancy, in case one should fail. This redundancy is necessary to make the drive circuit intrinsically safe. Node 74 is a reference node and represents the pull-up supply line for terminal 70 and for the open drain outputs of switching circuitry 80, which will be described in detail shortly.

In the preferred embodiment, open drain NAND gates 90, 92, 94, and 96 make up switching circuitry 80, which provides directional control and signal propagation between the microcontroller 24, at a first location, and the cable 30 that leads to the sensor electronics 40, at a second location. National Semiconductor Open Drain Quad NAND 74HC03 would be an appropriate choice for implementing switching circuitry 80. Switching circuitry 80 could also consist of alternative types of logics gates, as well. For example, other types of push-pull outputs could be used. One reason open drain gates have been selected is because they offer higher impedance than conventional gates.

Nodes 100, 102, and 104 are open drain outputs that are relatively low capacitive loads. Resistors 106, 108, and 110 are connected between the open drain outputs at nodes 100, 102, and 104, and the pull-up supply line 74. Resistors 106, 108, and 110 are used to pull up the low capacitance signal paths on the open drain switching circuits. In the preferred embodiment of switching circuitry 80, gate inputs 112 and 114 of NAND gates 92 and 94 are connected to the Vdc supply line 28 to ensure that a signal is always replicated based on the status of the directional control lines 60 and 66.

Node 104 is connected to data line 50 which is used for transmitting and receiving data to or from microcontroller 24. Connections 60 and 66 from microcontroller 24 are inputs to open drain NAND gates 90 and 96 respectively.

Connections 60 and 66 may be used by the microcontroller 24 to control the direction of data flow along the data line 50. A logic 1 level on connection 60 enables a write operation from the microcontroller 24 at a first location through the drive circuit 22 to the sensor electronics 40 at a second location. A logic 1 level on connection 66 enables a read operation from the sensor electronics 40 at a second location through the drive circuit 22 to the microcontroller 24 at a first location. Nodes 60 and 66 are configured to have opposite logic levels at all times. One way to accomplish this is to have a single directional control line coming out of the microcontroller, which splits into two lines, with one line going into one of connections 60 or 66, and the other line going through an inverter before going into the other of nodes 60 or 66.

Figure 4:
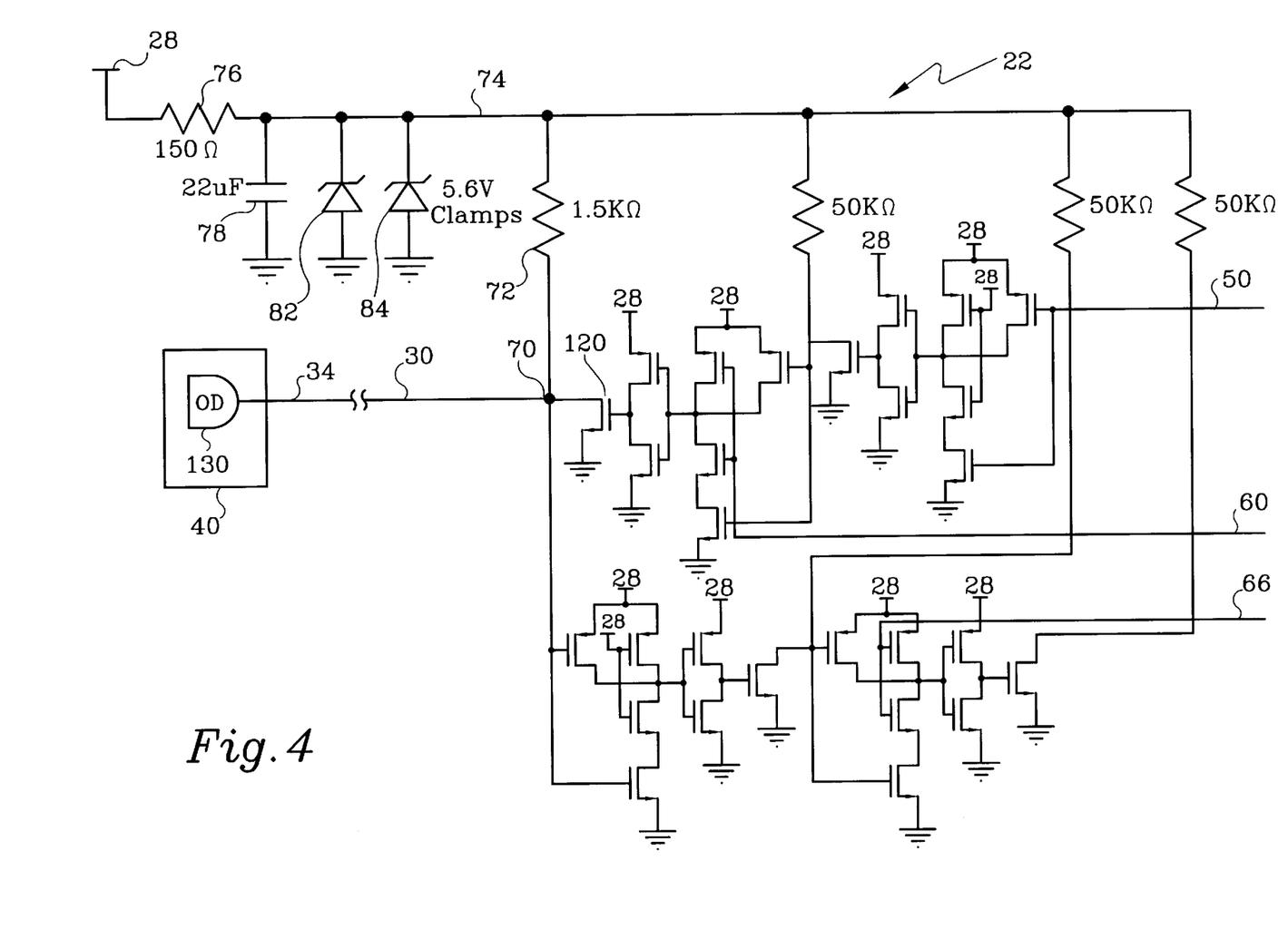
FIG. 4 is a schematic diagram showing the preferred embodiment of the invention at a transistor level.

FIG. 4 shows the drive circuit 22 of the present invention, with NAND gates 90, 92, 94, and 96 of FIG. 3 replaced with open drain MOSFET transistors. Cable 30 and sensor electronics 40 are also shown in FIG. 4.

Once the signal direction has been set by nodes 60 and 66, communication pulses can be transmitted. To transmit a logic low voltage level switching, transistor 120 is activated (turned on) to pull terminal 70 to ground. A logic high voltage level is realized by deactivating (turning off) transistor 120. This will allow pull-up resistor 72 and charge pump capacitor 78 to charge the cable capacitance to a valid high. Activation and deactivation of transistor 120 is accomplished automatically by the propagation of logic lows and highs through the switching circuitry since for a logic low the gate of transistor 120 will be high, allowing the discharging of capacitance to ground through the source of transistor 120.

Use of an open drain output 130 at the sensor electronics end of the cable 34 can be used to transmit signals from the sensor electronics 40 to the transmitter. Open drain output 130 can National Semiconductor Open Drain Quad NAND 74HC03, for example. When the open drain output 130 is grounded, cable 30 is pulled to a low logic level, which will also pull terminal 70 low, allowing the logic low voltage level to be received by the microcontroller (not shown). Similarly, open drain output 130 can be used to pull charge off the charge pump capacitor 78 to charge cable 30 and terminal 70 to a logic high voltage level. No open drain output is needed at end 34 of cable 30 if signals are not transmitted from the peripheral at the remote second location to the transmitter at the local first location. Additionally other methods may be used at the second location to send signals across the cable to the microcontroller at the first location.

Open drain outputs are used in the preferred embodiment because they allow multiple outputs to be connected together without having logic high contention between the outputs. When one circuit grounds the output node, all other circuits connected to that same node will be at a logic low level as well. Similarly, all circuits must be opened to get a logic high level. The use of pull-up resistors allow the open drain device to achieve a logic high level.

Resistor 72 and the capacitance associated with cable 30 make up the RC time constant of discharge that determines what length of cable can be driven while maintaining desired rise times. The relationship is governed by the following equation:

$$V_c = V_{cc}(1 - e_{RC/}^{-1})$$

where Vc equals the voltage that appears at the distant end of the cable, Vcc is the supply voltage from the charge pump, R is the value of the pull-up resistor (72 in FIG. 4), C is the capacitance of the cable, and t is the time required for discharge.

To achieve certain rise times, for example those mandated by International Institute of Communications (IIC) protocol, the capacitive load of the cable must be charged in a specified time. In FIG. 4, cable 30 is charged through resistor 72. If ⅔ Vcc is treated as a valid high logic level at the end of the cable containing the sensor electronics, and Vcc is 5 volts, then a voltage of approximately 3.33 volts must be attained. If the value of 72 is 1.5 kΩ, and a rise time of 1000 nS is desired, then insertion of the relevant quantities into the equation $_c = V_{cc}(1 - e_{RC/}^{-1})$ leads to a maximum driveable capacitance of 607.9 pF. If a cable having a capacitance of 10 pF/foot is used, then the maximum length of cable that could be driven would be 60.79 feet.

However, as charge is pulled off capacitor 78 during communication pulses, Vcc drops, which limits the amount of capacitance that can be driven under the acceptable rise time constraints. Therefore, a slightly shorter cable can be used, which will allow more than one communication pulse to be driven across the cable before the capacitor is required to be recharged. Computer simulations may be used to determine how many communication pulses can be sent or received with a certain load under specified rise time constraints. The pulsing will then be stopped, and the capacitor is allowed to recharge. As an example, a microcontroller in a transmitter might send or receive 10–30 communication pulses under IIC communications protocol, and then wait a period of time to allow recharging of the charge pump before initiating another 10–30 communication pulses. Node 70 in FIGS. 3 and 4 might only be pulsed for one percent of the total communication time, depending on the cable length, the available supply voltage and current, the value of the charge pump capacitor, and other variables. This period of inactivity in communication limits the average current through resistor 76 in FIGS. 3 and 4 to under 70uA, while maintaining the ability to drive a capacitive load requiring 3 mA to meet rise time constraints.

Intrinsic safety is realized by incorporating high impedance paths and energy limiting features into the drive circuit. The open drain gates 90, 92, 94, and 96 in FIG. 3 offer high impedance. Resistors 72, 76, 106, 108, and 110 in FIG. 3 limit the current from capacitor 78. Zener diodes 82 and 84 limit the voltage across capacitor 78.

Figure 5:
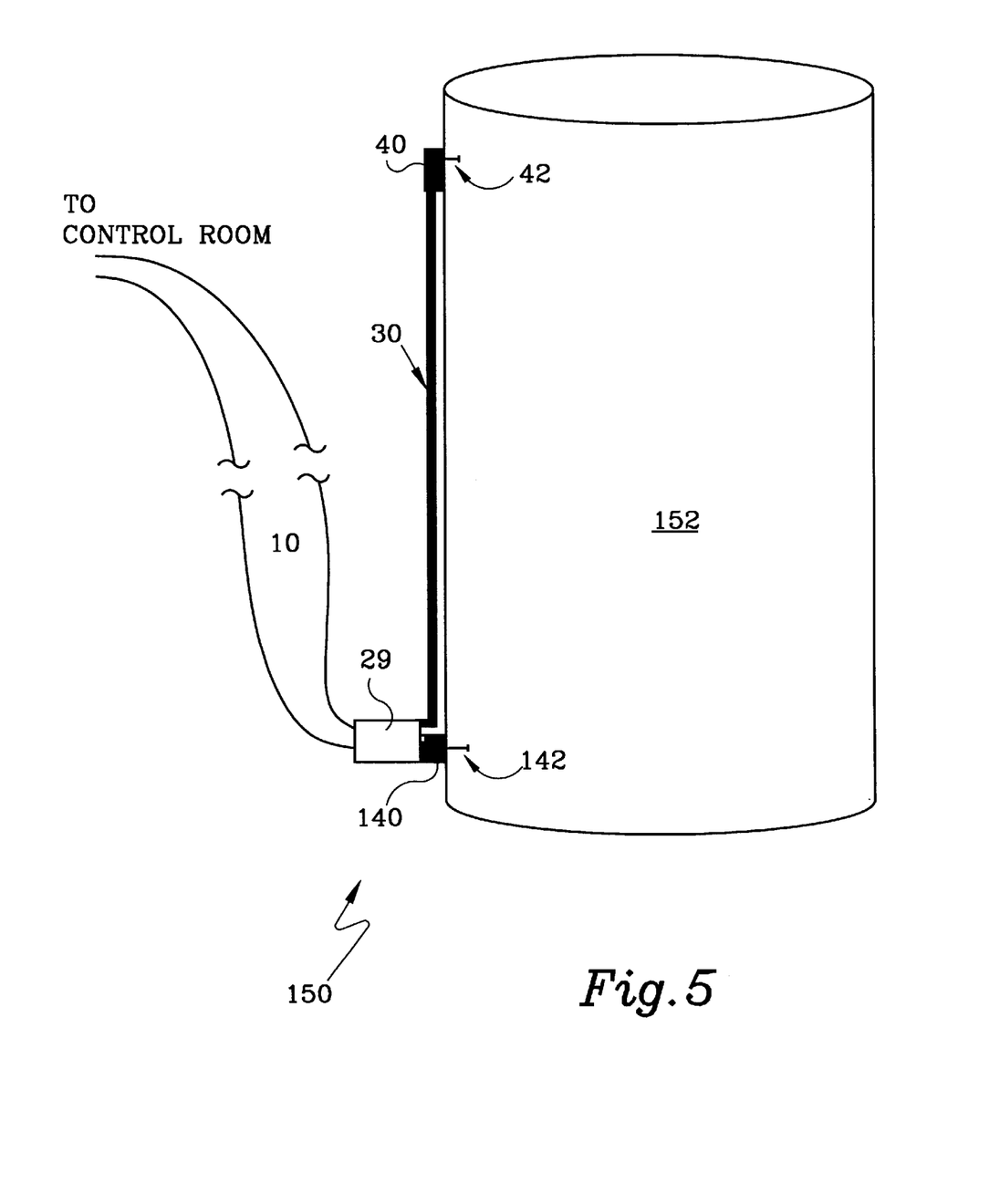
FIG. 5 is a diagram of part of a process control system having a transmitter incorporating a drive circuit according to the present invention.

FIG. 5 is a diagram showing part of one embodiment of a process control system 150 incorporating the drive circuit of the present invention. Transmitter 20 is coupled to control loop 10 and to a cable 30 connecting the transmitter 20, at a first portion of a tank 152, to sensor electronics 40, at a second portion of the tank. The transmitter 20 includes the drive circuit of the present invention. Transmitter 20 may include other devices as well, such as a microcontroller. Transmitter 20 is shown operating with two separate sensors. Sensor 42 at an upper portion of the tank, is connected to sensor electronics 42, through cable 30 to transmitter 20. Sensor 142, at a lower portion of the tank, is connected to sensor electronics 140, which is connected to transmitter 20. Sensor electronics 140 may also be inside the housing of the transmitter 20. Since sensor 142 and sensor electronics 140 are relatively close to the transmitter, no cable is needed, and the drive circuit of the present invention may possibly be omitted for a local device such as this. However, sensor 42 and sensor electronics 40 are relatively far from transmitter 20. The drive circuit of the present invention therefore allows the transmitter to communicate with the more remote sensor electronics 40 through cable 30. The transmitter 20 may contain electronics, including a microcontroller, which can process the data retrieved from sensors 42 and 142, and can cause appropriate action to be taken if the measured data differs from the allowable range for proper control of the particular process being controlled. This action may involve sending information across the 4–20mA control loop 10 to a central control room.

Now that the description of cable drive circuit 22 according to the teachings of the present invention has been set forth, many advantages and subtle features can be set forth and appreciated. For example, a key advantage of using the cable driver described by the present invention is the ability to drive signals at an acceptable rise time across a long cable while meeting low power constraints. The length of cable that can be driven is related to the cable characteristics. Data acquisition across a 30–40 foot long cable has been realized using the present invention, and longer length cable could be used as well, depending on the cable capacitance per foot, and other factors. Another advantage of the present invention is its intrinsically safe construction due to the current and voltage limiting characteristics. Another advantage of the present invention is that relatively few components are required.

Open drain NAND gates are used in the preferred embodiment because most conventional NAND gates are only able to drive about 10 μA. Output current from an open drain NAND gate is only limited by the supply voltage and the value of the pull-up resistors. Conventional NAND gates would not be able to drive as long a cable as open drain outputs or other push-pull outputs are able to drive.

The present invention allows the transmitter to be placed at a location that is isolated from the sensor electronics. Cable lengths of more than 30 feet can be driven with the cable drive circuit described herein. The characteristics of the cable, such as capacitance per linear foot, and the limitations in power availability are two constraints on the length of cable that can be driven.

By driving a long cable, the present invention allows the transmitter to be placed at a convenient location instead of requiring the transmitter to be placed close to the process variable being sensed. This may result in easier maintenance, increased safety, and more flexibility. Another advantage is that one transmitter can interface with two or more sensor electronics capsules, which can decrease total system costs. As an example, pressure in a large storage tank can be measured near the top of the tank and near the bottom of the tank using one transmitter. A transmitter could be placed near the pressure sensor at the bottom of the tank, while the cable drive circuit described herein could be used to drive a cable connected between the transmitter and a sensor electronics capsule near the top of the tank. Alternatively, two cable drive circuits could be used if it desired to place the transmitter at a distance from the sensor electronics capsules.

Although the present invention has been described with reference to preferred embodiments, one of ordinary skill in the art will recognize that changes may be made in form and detail without departing from the spirit and scope of the invention. For example, although the present invention has been described in conjunction with a microcontroller, other devices may be used instead of a microcontroller, including for example, a computer or microprocessor, or simpler means for providing a periodic digital signal. In addition, the preferred embodiment described above refers to sensor electronics being at the end of the driven cable. Other peripherals or devices may be substituted, such as electronically controlled valves or user interface devices or communicators. Another alteration of the preferred embodiment is to drive signals in only one direction by modifying the switching circuitry, such as by removing NAND gates 90, 92, 94, and 96 in FIG. 3 and replacing them with one open drain output connected between the microcontroller and node 70. For example, a switching transistor such as transistor 120 could be connected between a digital signal at data line 50 and node 70. Microcontroller 24 or some other control means could provide the digital signal and limit the duration or time period of the digital signal according to the teachings of the present invention. Such an embodiment would be useful, for example, to send information to a remote location, such as an electronic valve. Additionally, the transmitter has been described as being at a first location, and the sensor electronics at a second location. The correspondence between the first and second locations and their associated devices is purely arbitrary and may be reversed. The component values described herein are purely suggested values and other values would work as well, depending on the desired characteristics of the drive circuit.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. An intrinsically safe drive circuit for driving digital signals across a cable between a fist location and a second location comprising:

a first terminal for connection to a first digital signal;

a second terminal connected to a first end of said cable with a second end of said cable connected to a device at said second location;

pull up means connected to said second terminal;

first transistor switching means connected to said second terminal, said switching means responsive to said first digital signal, said switching means pulling said second terminal to a first logic level when said switching means is turned on and said pull up means pulling said second terminal to a second logic level when said switching means is turned off;

charge storage means connected to said pull up means, said charge storage means incrementally charging each time said pull up means pulls said second terminal to said second logic level; and control means for limiting said first digital signal to a first portion of a first period of time such that said charge storage means incrementally discharges during said first portion of said first period of time and does not incrementally discharge during a second portion of said first period of time allowing said charge storage means to recharge during said second portion of said first period of time.

2. Drive circuit of claim 1 wherein said charge storage means comprises:

voltage supply means;

current limiting means connected to said voltage supply means;

capacitance means connected to said current limiting means; and voltage limiting means connected to said capacitance means.

3. Drive circuit of claim 2 wherein said cable has a length and a value of capacitance related to said length and said pull up means is selected so that a digital signal at said second terminal has a first rise time.

4. Drive circuit of claim 3 wherein said voltage limiting means comprises at least a single zener diode.

5. Drive circuit of claim 1 wherein said device includes second transistor switching means connected to said second end of said cable, said control means is selectively configurable for providing digital information during said first portion of said first period of time and for receiving digital information during a first portion of a second period of time, and said drive circuit further comprises logic circuit means coupled to said control means and to said second terminal with said control means setting said logic circuit means to pass said first digital signal from said control means to said second terminal during said first portion of said first period of time and to pass a second digital signal from said second terminal to said control means during said first portion of said second period of time; said charge storage means incrementally discharging during said first portion of said second period of time and not discharging during a second portion of said second period of time so that said charge storage device recharges during said second portion of said second period of time.

6. Drive circuit of claim 5 wherein said control means comprises a microcontroller.

7. Drive circuit of claim 5 wherein a combination of said first transistor switching means and said logic circuit means comprises a plurality of NAND gates.

8. Drive circuit of claim 3 wherein said first transistor switching means and said second transistor switching means comprise open drain transistors.

9. Drive circuit of claim 5 wherein said first location is at a first portion of a tank, said second location is at a second portion of said tank and said second digital signal is representative of a pressure at said second location.

10. An intrinsically safe drive circuit for driving digital signals across a cable between a fist location and a second location comprising:
- a first terminal for connection to a first digital signal;
- a second terminal connected to a first end of said cable with said second end of said cable connected to a device at said second location;
- pull up means connected to said second terminal;
- first transistor switching means connected to said second terminal, said first transistor switching means responsive to said first digital signal, said first transistor switching means pulling said second terminal to a first logic level when said first transistor switching means is turned on and said pull up means pulling said second terminal to a second logic level when said first transistor switching means is turned off;
- second transistor switching means connected to said device at said second end of said cable, said second transistor switching means responsive to an output signal from said device, said second transistor switching means pulling said second end of said cable to said first logic level when said switching means is turned on and said pull up means pulling said second end of said cable to said second logic level when said second transistor switching means is turned off;
- charge storage means connected to said pull up means, said charge storage means incrementally charging each time said pull up means pulls said second terminal to said second logic level; and
- control means selectively configurable for providing digital information during a first portion of a period of time and for receiving digital information during a first portion of a second period of time, said charge storage means incrementally discharging during said first portion of said first period of time, said charge storage means not discharging during a second portion of said first period of time and a second portion of said second period of time allowing said charge storage means to recharge during said second portion of said first period of time and said second portion of said second period of time; and
- logic circuit means coupled to said control means and to said second terminal with said control means setting said logic circuit means to pass said first digital signal from said control means to said second terminal during said first portion of said first period of time and to pass a second digital signal from said second terminal to said control means during said first portion of said second period of time.

11. Drive circuit of claim 10 where said charge storage means comprises:
- voltage supply means;
- current limiting means connected to said voltage supply means;
- capacitance means connected to said current limiting means; and
- voltage limiting means connected to said capacitance means.

12. Drive circuit of claim 11 wherein said cable has a length and a value of capacitance related to said length and said pull up means is selected so that a digital signal at said second has a first rise time.

13. Drive circuit of claim 12 wherein said voltage limiting means comprises at least a single zener diode.

14. Drive circuit of claim 10 wherein said control means comprises a microcontroller.

15. Drive circuit of claim 10 wherein a combination of said first transistor switching means and said logic circuit means comprises a plurality of NAND gates.

16. Drive circuit of claim 12 wherein said first transistor switching means and said second switching means comprise open drain transistors.

17. Drive circuit of claim 10 wherein a combination of said first transistor switching means and said logic circuit means comprises:
- a first open drain NAND gate having a first input connected to a first node of said control means, a second input connected through a first resistor to said pull up means, and an output connected to said second terminal;
- a second open drain NAND gate having a first input connected to said first terminal, a second input connected to said voltage supply means, and an output connected through said first resistor to said pull up means;
- a third open drain NAND gate having a first input connected to said second terminal, a second input connected to said voltage supply means, and an output connected through a second resistor to said pull up means; and
- a fourth open drain NAND gate having a first input connected to a second node of said control means, a second input connected through said second resistor to said voltage supply means, and an output connected to said first terminal, wherein said first node of said control means is at a logic high level and said second node of said control means is at a logic low level during said first portion of said first period of time, and wherein said first node of said control means is at a logic low level and said second node of said control means is at a logic high level during said first portion of said second period of time.

18. Drive circuit of claim 10 wherein said first location is at a first portion of a tank, said second location is at a second portion of said tank and said second digital signal is representative of a pressure at said second location.

19. An intrinsically safe drive circuit for driving digital signals across a cable between a first location and a second location comprising:
- a first terminal for connection to a first digital signal;
- a second terminal connected to a first end of said cable with said second end of said cable connected to a device at said second location;
- pull up means connected to said second terminal;
- charge storage means connected to said pull up means;
- first transistor switching means connected to said second terminal, said first transistor switching means responsive to said first digital signal, said first transistor switching means pulling said second terminal to a first logic level when said first transistor switching means is turned on and said pull up means pulling said second terminal to a second logic level when said first transistor switching means is turned off;
- second transistor switching means connected to said device at said second end of said cable, said second transistor switching means responsive to an output signal from said device, said second transistor switching means pulling said second end of said cable to said first logic level when said switching means is turned on and said pull up means pulling said second end of said cable to said second logic level when said second transistor switching means is turned off;

control means selectively configurable for providing digital information during a first portion of a period of time and for receiving digital information during a first portion of a second period of time;

logic circuit means coupled to said control means and to said second terminal with said control means setting said logic circuit means to pass said first digital signal from said control means to said second terminal during said first period of time and to pass a second digital signal from said second terminal to said control means during said second period of time, said first transistor means in combination with said logic circuit means includes, a first open drain NAND gate having a first input connected to a first node of said control means, a second input connected through a first resistor to said pull up means, and an output connected to said second terminal;

a second open drain NAND gate having a first input connected to said first terminal, a second input connected to said voltage supply means, and an output connected through said first resistor to said pull up means;

a third open drain NAND gate having a first input connected to said second terminal, a second input connected to said voltage supply means, and an output connected through a second resistor to said pull up means; and a fourth open drain NAND gate having a first input connected to a second node of said control means, a second input connected through said second resistor to said voltage supply means, and an output connected to said first terminal, wherein said first node of said control means is at a logic high level and said second node of said control means is at a logic low level during said first period of time, and wherein said first node of said control means is at a logic low level and said second node of said control means is at a logic high level during said second period of time.

20. An arrangement for driving digital signals trough a cable comprising:

a terminal coupled to the cable;

a storage device coupled to the terminal; and, a controller coupled to the terminal, wherein the controller is arranged to control the terminal between first and second states so as to drive the digital signals through the cable, when the storage device discharges into the controller when the terminal is in the first state, wherein the storage device drives the cable when the terminal is in the second state, and wherein the controller is arranged to periodically inhibit the terminal having the first state for sufficient time to permit the storage device to recharge.

21. The arrangement of claim 20 wherein the controller is a logic circuit.

22. The arrangement of claim 20 wherein the storage device includes a first impedance coupling the storage device to a source and a second impedance coupling the storage device to the terminal.

23. The arrangement of claim 20 wherein the cable has first and second ends, wherein the first end of the cable is coupled to the terminal, wherein the second end of the cable is coupled to a sensor, and wherein the sensor is arranged to drive the second end of the cable between the first and second states so as to transmit information to the controller.

\* \* \* \* \*